Oct. 9, 1956 W. R. SEIPT 2,766,131
METHOD FOR THE MANUFACTURE OF CALCIUM SILICATE TYPE INSULATION
Filed May 18, 1954
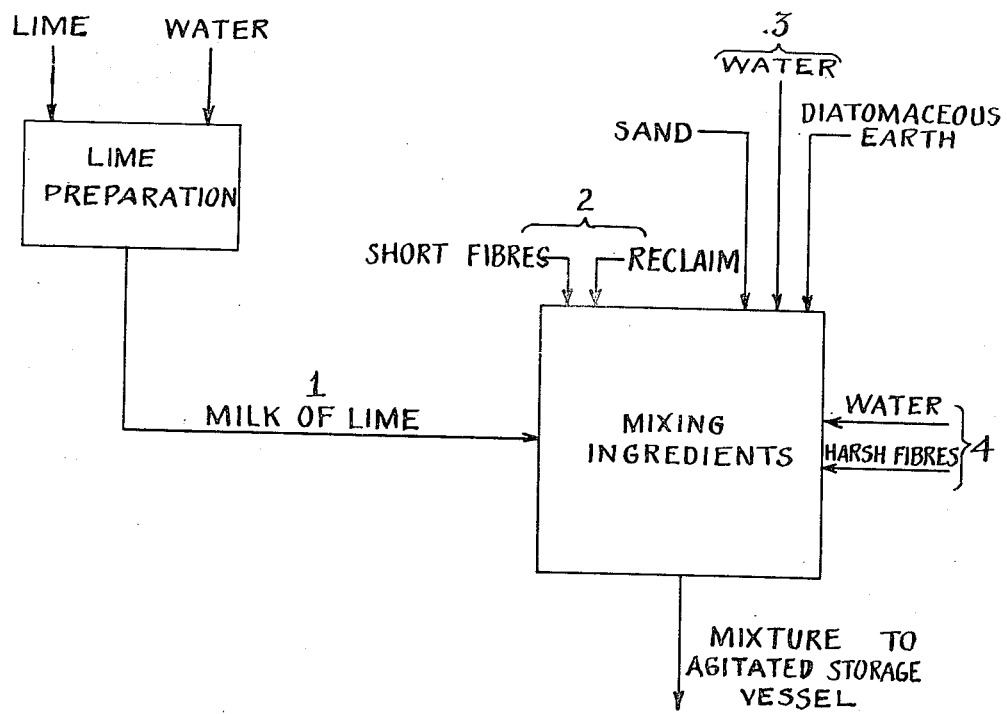
INVENTOR
WILLARD R. SEIPT
BY
ATTORNEYS (United States Patent Office — 2,766,131 — Patented Oct. 9, 1956)

2,766,131
METHOD FOR THE MANUFACTURE OF CALCIUM SILICATE TYPE INSULATION

Willard R. Seipt, North Wales, Pa., assignor to Keasbey & Mattison Company, Ambler, Pa., a corporation of Pennsylvania Application May 18, 1954, Serial No. 430,544

4 Claims. (Cl. 106—120)

This invention relates to the manufacture of calcium silicate-type insulation, and the invention is especially concerned with improvements in the method for preparing a castable slurry of the insulation-forming ingredients.

The principal ingredients which go into the manufacture of the calcium silicate type of insulation are lime, siliceous material and reinforcing asbestos fibres. In general, the ingredients are worked up in the form of an aqueous dispersion or slurry of appropriate consistency for casting. The slurry is then introduced into molds, frequently of the pancast type, and the charged molds are then cured in an autoclave under pressure.

An insulation of this general kind is disclosed and claimed in my copending application Serial No. 104,128, filed July 11, 1949 (now Patent No. 2,716,070, issued August 23, 1955). In accordance with the disclosure of said application, at least a substantial part of the reinforcing asbestos fibres comprise so-called "harsh" asbestos fibres, i. e., fibres which are relatively long and stiff and which will spring back quickly after being deflected or bent, provided, of course, the deflection is insufficient to break the fibre.

The harsh fibres are valuable herein for their reinforcing properties, and when the term "harsh fibres" is used, we are referring to those grades of fibre which, even though they are of suitable length, consist predominately of fibres which cannot be effectively utilized in the production of spun textiles using the conventional spinning techniques and equipment, i. e., the so-called "non-spinnable" or "non-spinning" grades of long fibres. The spinnable fibres have a length equivalent to at least a grade 3 Canadian chrysotile as classified by the Quebec Box Test.

For reasons which need not be considered in detail herein but which are fully developed in said copending application, advantageous properties are contributed to the insulation by virtue of the employment of harsh fibres for reinforcement of the insulation. However, harsh fibres tend to be more brittle than soft fibres, and this factor introduces a problem in the preparation of the slurry from which the insulation is to be formed. The problem in question is to obtain thorough dispersion or distribution of the fibres and also intimate admixture of all of the ingredients of the slurry without excessively breaking up the brittle harsh fibres and thereby impairing the reinforcing value thereof in the finished insulation.

Although the present invention is of general utility in the preparation of slurries from which calcium silicate type insulations may be cast and formed, regardless of the character of the fibres incorporated, for the reasons briefly mentioned above, the invention is of especial utility where the reinforcing fibres, or at least a substantial portion thereof, constitute harsh asbestos fibres. Indeed, by virtue of employment of the technique of the present invention for preparation of the slurry, it is even possible to employ the harshest asbestos fibres and at the same time beneficially utilize their reinforcing properties since they will not be broken up appreciably during the mixing operation.

It will be understood that an insulation forming slurry prepared according to the present invention may include ingredients in addition to the principal ingredients referred to above and, in fact, it is preferred to incorporate not only the harsh reinforcing fibres most of which are relatively long, but also at least a minor quantity of short asbestos fibres and/or a minor amount of powdered previously prepared insulation of similar kind. Such short fibres, where used, may either be soft or harsh, but, if harsh, the brittleness thereof does not raise the problem above mentioned in the mixing technique as do the long harsh fibres being relied upon for reinforcement. The short fibres and also the powdered insulation aid in providing better suspension of the other solid ingredients and thereby prevent settling or segregation either in a general or local sense, and at the same time the flowability of the slurry is improved.

In addition, it is desirable that the siliceous material be introduced in part by the use of pulverized quartz silica or sand and in part by the use of diatomaceous earth.

The single figure of the drawing accompanying this application diagrammatically illustrates the preparation of a slurry according to the present invention, containing all of the ingredients referred to above.

As is indicated in the drawing, lime and a portion of the total water to be used in the slurry are preferably first intermixed, or prepared to provide what may be termed milk of lime, with which the other ingredients are mixed. In a typical operation according to the invention, the milk of lime is introduced into a mixing vessel equipped with controllable mechanism for agitation. The short fibres and/or pulverized previously prepared insulation of the same or similar kind (referred to in the drawing as Reclaim) are then added to the milk of lime and thoroughly dispersed therein by vigorous agitation. Following this period of agitation the siliceous material is added, preferably including both sand and diatomaceous earth, together with some additional water. Further vigorous agitation is then applied to effect intimate dispersion of the siliceous material in the mixture. The total quantity of water added up to this time is preferably considerably less than half of the total ultimately to be included in the slurry, because the siliceous material can be more effectively dispersed therein and if the dispersion is not too dilute during the mixing, tendency for the dispersion to be lost through settling of the siliceous material will be decreased.

After sufficient agitation to thoroughly disperse the siliceous material, a substantial quantity of water and the harsh reinforcing fibres are added to the dispersion. The harsh reinforcing fibres can be added either before, during or after the dispersion has become further diluted by the introduction of additional water. However, when the harsh fibres are added to the dispersion before the additional water is added thereto, it is then desirable that agitation be stopped while the harsh fibres are being added to the slurry.

The controlled agitation which then follows provides for uniform dilution of the slurry and for thorough distribution of the reinforcing fibres throughout the slurry while the slurry is in relatively dilute condition and this greatly reduces breakdown of the fibres, even where harsh and brittle reinforcing fibres are employed.

The agitation of the slurry following the addition of the reinforcing fibres is preferably divided into two stages, the first of which is of relatively short duration and is rapid or vigorous and the second of which is of longer duration and is of a milder or slower type.

When the batch of slurry is completely mixed it may be delivered to a storage or supply vessel from which the molds are charged, preferably a supply vessel provided with some agitation means operating so as to provide a very mild agitation, i. e., merely sufficient agitation to keep the various ingredients distributed and uniformly dispersed in the slurry, but without causing appreciable damage to the harsh reinforcing fibres.

The following is given by way of a specific example of the mixing technique described in general details just above.

165 pounds of high calcium pebble quick lime are mixed with 118 gallons of water to prepare the milk of lime for use in a batch. This batch of the milk is introduced into the mixing vessel, for instance a generally cylindrical tank about three and one-half feet in diameter and about six feet high, having an impeller or mixer rotating therein on an upright axis well below the center thereof.

27 pounds of powdered Reclaim and 12 pounds of short soft chrysotile asbestos fibres (grade number 5–R) are also introduced into the mixing vessel and these ingredients are vigorously agitated for six minutes. Thereafter 76 pounds of pulverized quartz silica and 165 pounds of diatomaceous earth, together with 45 gallons of water are introduced and these ingredients are then vigorously agitated for an additional period of six minutes. This effectively and thoroughly disperses the siliceous material in the batch. 255 gallons of water are then added, as are also 105 pounds of long, harsh asbestos (amosite) fibres. The agitator is then operated for one minute at high speed and the speed is then reduced to a low value and the mild agitation continued for five minutes more. The initial vigorous agitation is desirable, but not essential in that it expedites wetting the fibres. This operation can however be effected by mild agitation for a slightly longer time interval. Thereafter thorough distribution of the long fibres will be effected and the batch is prepared for discharge to the storage or mold supply vessel.

It will be understood that the foregoing is given only by way of example and that variations in proportions of ingredients and also some variation in exact sequence of addition of certain ingredients may be resorted to. With respect to proportions of ingredients, the following ranges are given as representative:

The quick lime used should have at least 80% available calcium oxide, preferably at least 90%. This should be a quick slaking lime, most desirably what is known as an immediately slaking lime.

In preparing the milk of lime there should be a range of from 3 to 10 parts by weight of water to one part of lime.

On the basis of the total solids content of the slurry being prepared, the lime should represent from about 20 to 40% by weight.

The short fibres may range anywhere up to about 5%, a typical figure being in the neighborhood of 2% by weight of the total solids of the slurry. The quantity of Reclaim may be anywhere up to about 25%.

The siliceous material (including both the sand and the diatomaceous earth) should be present in an amount capable of supplying reactable silica in the range of from one to three mols silica to one mol of lime. The ratio of silica sand to diatomaceous earth should be such that from 60 to 34% of the reactable silica is supplied by the sand, and 40 to 66% of the reactable silica by the diatomaceous earth.

The water added at the time of addition of the siliceous material may be from 50 to 100% by weight of the total solids to be included in the slurry.

The quantity of harsh reinforcing fibres should be from 8 to 40% of the dry solids content of the slurry.

The water added at the time of adding the harsh reinforcing fibres may be from about 200 to 600% of the total solids.

The total water of the slurry should be from three to eight times the weight of the solids in the slurry.

From the standpoint of effective distribution of the harsh reinforcing fibres, without excessive breakdown of fibre length, various of the previously added ingredients may be introduced in various ways, but it is preferred to add the harsh reinforcing fibres and effect agitation to distribute them throughout the mass only in the presence of all or substantially all of the water to be included in the slurry. It is also preferred not to have all of the water present at the time of dispersion of the siliceous material.

I claim:

1. In the manufacture of calcium silicate insulation having "harsh" reinforcing asbestos fibers incorporated therein, the method of preparing a slurry containing the insulation-forming ingredients and a quantity of water constituting from three to eight times the weight of the total solids present in the slurry, which method comprises intermixing lime and siliceous material with a quantity of water less than half of the total water to be incorporated in the slurry, agitating said mixture to form an intimate dispersion of the lime and siliceous material in the water, thereafter adding additional water and said harsh asbestos fibers to the dispersion, the amount of said additional water being sufficient to bring the total water content to from three to eight times the weight of the total solids content, and then further agitating the dispersion to effect uniform dilution thereof with the added water and to thoroughly distribute the asbestos fibers therein without appreciably breaking down the length of the harsh asbestos fibers.

2. A method according to claim 1 in which the agitation of the dispersion after the addition of the asbestos fibers is effected in two stages, the first of which is more vigorous than the second and the second of which is of longer duration than the first.

3. In the manufacture of calcium silicate insulation having "harsh" reinforcing asbestos fibers incorporated therein, the method of preparing a slurry containing the insulation-forming ingredients and a quantity of water constituting from three to eight times the total weight of the solids present in the slurry which method comprises intermixing lime with a quantity of water less than half of the total weight to be incorporated in the slurry to form milk of lime, then intermixing the milk of lime with siliceous material, agitating the milk of lime and siliceous material to form an intimate dispersion thereof, thereafter adding additional water and said harsh asbestos fibers to the dispersion, the amount of said additional water being sufficient to bring the total water content to from three to eight times the weight of the total solids content, and then further agitating the dispersion to effect uniform dilution thereof with the added water and to thoroughly distribute the asbestos fibers therein without appreciably breaking down the length of the harsh asbestos fibers.

4. In the manufacture of calcium silicate insulation having two asbestos fiber components one of which comprises relatively short asbestos fibers and the other of which comprises relatively long "harsh" reinforcing asbestos fibers, the method of preparing a slurry containing the insulation-forming ingredients and a quantity of water constituting from three to eight times the weight of the total solids present in the slurry, which method comprises intermixing lime, siliceous material and the short asbestos fibers with a quantity of water less than half of the total water to be incorporated in the slurry, agitating the said intermixture to thoroughly distribute the short fibers therein, thereafter adding additional water and said harsh asbestos fibers to the dispersion, the amount of said additional water being sufficient to bring the total water content to from three to eight times the weight of the total solids content, and then further agitating the dispersion to effect uniform dilution thereof with the added water and to thoroughly distribute the asbestos fibers therein without appreciably breaking down the length of the harsh asbestos fibers.

References Cited in the file of this patent

UNITED STATES PATENTS

| | | |
|---|---|---|
| Re. 23,228 | Fraser | May 9, 1950 |
| 1,241,211 | Hay | Sept. 25, 1917 |
| 2,456,643 | Napier | Dec. 21, 1948 |